(12) United States Patent
Roth et al.

(10) Patent No.: US 7,916,939 B2
(45) Date of Patent: Mar. 29, 2011

(54) HIGH BRIGHTNESS WIDE GAMUT DISPLAY

(75) Inventors: Shmuel Roth, Petach Tikva (IL); Ilan Ben-David, Rosh Ha'ayin (IL); Moshe Ben-Chorin, Rehovot (IL)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/627,889

(22) Filed: Nov. 30, 2009

(65) Prior Publication Data

US 2010/0134515 A1 Jun. 3, 2010

Related U.S. Application Data

(63) Continuation of application No. 12/272,850, filed on Nov. 18, 2008, now Pat. No. 7,627,167, which is a continuation of application No. 10/491,726, filed as application No. PCT/IL03/00610 on Jul. 24, 2003, now Pat. No. 7,471,822.

(60) Provisional application No. 60/397,781, filed on Jul. 24, 2002.

(51) Int. Cl.
  *G06K 9/00* (2006.01)
(52) U.S. Cl. .................. 382/162; 382/167; 382/168
(58) Field of Classification Search .......... 382/162, 382/167, 168; 345/32, 84, 691, 743; 353/4; 348/743, E7.027; 359/634; 349/106; 315/312
  See application file for complete search history.

(56) References Cited

U.S. PATENT DOCUMENTS

| | | |
|---|---|---|
| 2,412,098 A | 12/1946 | Schantz |
| 3,699,244 A | 10/1972 | Cohen et al. |
| 4,390,893 A | 6/1983 | Russell et al. |
| 4,751,535 A | 6/1988 | Myers |
| 4,800,375 A | 1/1989 | Silverstein et al. |
| 4,843,381 A | 6/1989 | Baron |
| 4,843,573 A | 6/1989 | Taylor et al. |
| 4,892,391 A | 1/1990 | Stewart et al. |
| 4,952,972 A | 8/1990 | Someya |
| 4,985,853 A | 1/1991 | Taylor et al. |
| 4,994,901 A | 2/1991 | Parulski et al. |
| 5,042,921 A | 8/1991 | Sato et al. |
| 5,087,610 A | 2/1992 | Hed |
| 5,184,114 A | 2/1993 | Brown |
| 5,188,452 A | 2/1993 | Ryan |
| 5,191,450 A | 3/1993 | Yajima et al. |
| 5,214,418 A | 5/1993 | Fukumura et al. |
| 5,233,183 A | 8/1993 | Field |
| 5,233,385 A | 8/1993 | Sampsell |
| 5,243,414 A | 9/1993 | Dairymple et al. |
| 5,365,283 A | 11/1994 | Doherty et al. |

(Continued)

FOREIGN PATENT DOCUMENTS

EP   0367848   5/1990

(Continued)

OTHER PUBLICATIONS

U.S. Appl. No. 09/710,895, filed Nov. 14, 2000, Ben David et al.

(Continued)

*Primary Examiner* — Anh Hong Do
(74) *Attorney, Agent, or Firm* — Innovation Counsel LLP

(57) ABSTRACT

A device to produce a color image, the device including a color filtering arrangement to produce at least four colors, each color produced by a filter on a color filtering mechanism having a relative segment size, wherein the relative segment sizes of at least two of the primary colors differ.

16 Claims, 9 Drawing Sheets

U.S. PATENT DOCUMENTS

| | | | |
|---|---|---|---|
| 5,416,890 A | 5/1995 | Beretta |
| 5,447,811 A | 9/1995 | Buhr et al. |
| 5,455,600 A | 10/1995 | Freidman et al. |
| 5,528,317 A | 6/1996 | Gove et al. |
| 5,563,621 A | 10/1996 | Silsby |
| 5,570,108 A | 10/1996 | McLaughlin et al. |
| 5,588,050 A | 12/1996 | Kagawa et al. |
| 5,592,188 A | 1/1997 | Doherty et al. |
| 5,614,925 A | 3/1997 | Braudaway et al. |
| 5,625,424 A | 4/1997 | Conner et al. |
| 5,631,734 A | 5/1997 | Stem et al. |
| 5,642,176 A | 6/1997 | Abukawa et al. |
| 5,650,832 A | 7/1997 | Poradish et al. |
| 5,650,942 A | 7/1997 | Granger |
| 5,657,036 A | 8/1997 | Markandey et al. |
| 5,668,572 A | 9/1997 | Meyer et al. |
| 5,673,093 A | 9/1997 | Brody |
| 5,724,062 A | 3/1998 | Hunter |
| 5,736,754 A | 4/1998 | Shi et al. |
| 5,740,334 A | 4/1998 | Lin et al. |
| 5,751,385 A | 5/1998 | Heinze |
| 5,798,805 A | 8/1998 | Ooi et al. |
| 5,812,303 A | 9/1998 | Hewlett et al. |
| 5,835,099 A | 11/1998 | Marimont |
| 5,841,494 A | 11/1998 | Hall |
| 5,844,540 A | 12/1998 | Terasaki |
| 5,844,699 A | 12/1998 | Usami et al. |
| 5,863,125 A | 1/1999 | Doany |
| 5,870,530 A | 2/1999 | Balasubramanian |
| 5,872,898 A | 2/1999 | Mahy |
| 5,892,891 A | 4/1999 | Dalal et al. |
| 5,909,227 A | 6/1999 | Silverbrook |
| 5,982,347 A | 11/1999 | Shigeta et al. |
| 5,982,541 A | 11/1999 | Li et al. |
| 5,999,153 A | 12/1999 | Lind et al. |
| 5,999,278 A | 12/1999 | Suzuki et al. |
| 6,018,237 A | 1/2000 | Havel |
| RE36,654 E | 4/2000 | Conner et al. |
| 6,058,207 A | 5/2000 | Tuijn et al. |
| 6,069,601 A | 5/2000 | Lind et al. |
| 6,072,464 A | 6/2000 | Ozeki |
| 6,097,367 A | 8/2000 | Kuriwaki et al. |
| 6,144,420 A | 11/2000 | Jung |
| 6,147,720 A | 11/2000 | Guriont et al. |
| 6,157,735 A | 12/2000 | Holub |
| 6,191,826 B1 | 2/2001 | Murakami et al. |
| 6,198,512 B1 | 3/2001 | Harris |
| 6,220,710 B1 | 4/2001 | Raj et al. |
| 6,225,974 B1 | 5/2001 | Marsden et al. |
| 6,231,190 B1 | 5/2001 | Dewald |
| 6,236,390 B1 | 5/2001 | Hitchcock |
| 6,236,406 B1 | 5/2001 | Li |
| 6,239,783 B1 | 5/2001 | Hill et al. |
| 6,246,396 B1 | 6/2001 | Gibson et al. |
| 6,256,073 B1 | 7/2001 | Pettitt |
| 6,259,430 B1 | 7/2001 | Riddle et al. |
| 6,262,710 B1 | 7/2001 | Smith |
| 6,262,744 B1 | 7/2001 | Carrein |
| 6,278,540 B1 | 8/2001 | Wang |
| 6,280,034 B1 | 8/2001 | Brennesholtz |
| 6,304,237 B1 | 10/2001 | Karakawa |
| 6,324,006 B1 | 11/2001 | Morgan |
| 6,366,291 B1 | 4/2002 | Taniguchi et al. |
| 6,380,961 B1 | 4/2002 | Van der Loop et al. |
| 6,388,648 B1 | 5/2002 | Clifton et al. |
| 6,404,970 B1 | 6/2002 | Grsnsden et al. |
| 6,407,766 B1 | 6/2002 | Ramanujan et al. |
| 6,456,301 B1 | 9/2002 | Huang |
| 6,459,425 B1 | 10/2002 | Holub et al. |
| 6,467,910 B1 | 10/2002 | Sato |
| 6,477,270 B1 | 11/2002 | Wu |
| 6,538,742 B1 | 3/2003 | Ohsawa |
| 6,549,213 B1 | 4/2003 | Sadka |
| 6,567,134 B1 | 5/2003 | Morgan |
| 6,570,584 B1 | 5/2003 | Cok et al. |
| 6,580,482 B1 | 6/2003 | Hiji et al. |
| 6,594,387 B1 | 7/2003 | Pettitt et al. |
| 6,633,302 B1 | 10/2003 | Ohswawa et al. |
| 6,674,489 B1 | 1/2004 | Kagawa et al. |
| 6,750,992 B1 | 6/2004 | Holub |
| 6,757,428 B1 | 6/2004 | Lin et al. |
| 6,865,292 B1 | 3/2005 | Kagawa et al. |
| 6,870,523 B1 | 3/2005 | Ben-David et al. |
| 6,912,017 B1 | 6/2005 | Minami et al. |
| 6,972,736 B1 | 12/2005 | Wada et al. |
| 7,129,955 B2 | 10/2006 | Motomura |
| 7,352,488 B2 | 4/2008 | Ben-Chorin et al. |
| 2002/0005829 A1 | 1/2002 | Ouchi |
| 2002/0109821 A1 | 8/2002 | Huibers et al. |
| 2002/0122019 A1 | 9/2002 | Baba et al. |
| 2002/0149546 A1 | 10/2002 | Ben-Chorin et al. |
| 2002/0163526 A1 | 11/2002 | Haseltine et al. |
| 2002/0167528 A1 | 11/2002 | Edge |
| 2002/0186229 A1 | 12/2002 | Brown Elliott |
| 2003/0085906 A1 | 5/2003 | Elliott et al. |
| 2007/0001994 A1 | 1/2007 | Roth |

FOREIGN PATENT DOCUMENTS

| | | |
|---|---|---|
| EP | 0547603 | 6/1993 |
| EP | 0653879 | 5/1995 |
| JP | 59-159131 | 9/1984 |
| JP | 60263122 | 12/1985 |
| JP | 62-222774 | 9/1987 |
| JP | 06-261332 | 9/1994 |
| JP | H06-337392 | 12/1994 |
| JP | 07-043658 | 2/1995 |
| JP | 08-86994 | 4/1996 |
| JP | 08-248410 | 9/1996 |
| JP | 09251160 | 9/1997 |
| JP | 10307205 | 11/1998 |
| JP | H11-502094 | 2/1999 |
| JP | H11-264953 | 9/1999 |
| JP | 2000-241916 | 9/2000 |
| JP | 2000-253263 | 9/2000 |
| JP | 2000-338950 | 12/2000 |
| JP | 2002-149148 | 5/2002 |
| JP | 2002-191055 | 7/2002 |
| WO | WO 95/10160 | 4/1995 |
| WO | WO 97/24871 | 7/1997 |
| WO | WO 97/35424 | 9/1997 |
| WO | WO 97/42770 | 11/1997 |
| WO | WO 01/95544 | 12/2001 |
| WO | WO 02/11112 | 2/2002 |
| WO | WO 02/50763 | 6/2002 |
| WO | WO 02/091299 | 11/2002 |
| WO | WO 02/091348 | 11/2002 |
| WO | WO 02/091349 | 11/2002 |
| WO | WO 02/09557 | 12/2002 |
| WO | WO 02/101644 | 12/2002 |
| WO | WO 03/058587 | 7/2003 |

OTHER PUBLICATIONS

Supplemantry European Search Report of Application No. 01271603 dated Nov. 17, 2005.

European Office Action of Application No. 01271603.1 dated Jul. 6, 2007.

International Search Report of Application No. PCT/IL01/01179 dated May 22, 2002.

"A critical Review of Spectral Models Applied to Binary Color Printing", Wyble and Berns, Colors Research and Application, vol. 25, 2000, pp. 4-19.

Chinese Office Action of Application No. 038228092 dated Aug. 22, 2007.

Supplemantry European Search Report of Application No. 03741035 dated Dec. 1, 2005.

European Office Action of Application No. 03741035.4 dated Apr. 8, 2008.

International Search Report of Application No. PCT/IL03/00610 dated Feb. 19, 2004.

Japanese Office Action of Application No. 2004-522672 dated Feb. 2, 2010.

Yamaguchi et al., "Multiprimary Color Display Using Holographic Optical Element", SPIE, vol. 3293, 1998, pp. 70-77.

K. Takatori et al., "Field-sequential Smectic LCD with TFT Pixel Amplifier", SID 01 Digest, pp. 48-51, 2001.

Jeffrey A. Shimizu, "Scrolling Color LCOS for HDTV Rear Projection", SID 01 Digest, pp. 1072-1075.

Francisco H. Imai, Color Sceince; "Spectral reproduction from scene to hardcopy", Part 1-Multi-spectral acquisition and spectral estimation using a Trichromatic Digital Camera System associated with absorption filters.

Rosen et al., "Spectral Reproduction from scene to Hardcopy II: Image Processing", Munsell Color Science Laboratory, RIT—Proceedings of SPIE vol. 4300 (2001).

Gunter Wyszecki & W.S. Stiles, Color Science; Concepts and Methods, Quantitative Data and Formulae, 2d. Ed., 1982, pp. 179-183.

Pointer, M.R., "The Gamut of Real Surface Colors", Color Research & Appl. 5(3):145-155, 1980.

Ajito et al., "Expanded Color Gamut Reproduced by Six-Primary Projection Display", Proc. SPIE, vol. 2954 (2000), pp. 130-137.

Ajito et al., "Multiprimary Color Display for Liquid Crystal Display Projectors Using Diffraction Granting", Optical Eng. 38(11): 1883-1888 (Nov. 1999).

Ajito et al., "Color Conversion Method for Multiprimary Display Using Matrix Switching", Optical Review, vol. 9, No. 3 (2001), 191-197.

Sugiura, T., 11.4: Invited Paper: "EBU Color Filter for LCDs", Toppan Printing Co., Japan, SID, 2001, pp. 146-149.

Horibe et al., "High Efficiency and High Visual Quality LCD Backlighting System", Faculty of Sceince and Technology, Kelo University, Japan, pp. 1-4.

Yamaguchi et al., "Color image reproduction based on the multispectral and multiprimary imaging: Experimental evaluation", Device Independent Color, Color Hardcopy and applications VII, Proc. SPIE, vol. 4663, pp. 15-26.

Hiyama et al., "LN-3:Four-Primary Color 15-in XGA TFT-LCD with Wide Color Gamut", Japan, Eurodisplay 2002, pp. 827-830.

Supplementary European Search Report of Application No. 03706857 dated Sep. 20, 2006.

Betrisey et al., "20.4: Displaced Filtering for Patterned Displays", Microsoft corporation, Society for Information Display, 2000, SID, pp. 1-4.

Daly, Scott, "47.3: Analysis of Subtriad Addressing Algorithms by Visoal System Models", Center for Displayed Appearance, Sharp Laboratories of America, Camas, WA, USA, 2001, SID, pp. 1200-1203.

Klompenhouwer et al., "13.4:Subpixel Image Scaling for Color Matrix Displays", Phillips Research Laboratories, Einhoven, The Netherlands, 2002, SID, pp. 176-179.

Credelle et al., "9-2: MTF of High-Resolution Pen Tile Matrix Displays", Eurodisplay 2002, pp. 159-162.

Platt, J., "Optimal Filtering for Patterned Displays", Microsoft research, pp. 1-4.

Sugiura et al., "P-24: LCD Module Adopting a Color Conversion Circuit", Japan, SID, 2002, pp. 288-291.

International Search Report of Application No. PCT/IL03/00307 dated Sep. 11, 2003.

International Search Report of Application No. PCT/IL03/00020 dated Jul. 2, 2003.

Supplementary European Search Report of Application No. 02733203 dated Oct. 5, 2005.

Keith Jack, Video Demystified, $3^{rd}$ Edition, LLH Technology Publishing 2001, pp. 215-219.

Yajima et al., "Wide Color Gamut System", Proc. of SMPTE, Advanced Television and Electronic Imaging, Feb. 10-11, 1995, pp. 112-119.

Elliott et al., "13.3: Co-Optimization of Color AMLCD Subpixel Architecture and Rendering Algorithms", ClairVoyante Laboratories, USA and AMLCD, Semiconductor Business, Korea, pp. 1-4.

Elliott, C., "Active Matrix Display Layout Optimization of Sub-pixel Image Rendering", ClairVoyante Laboratories, USA, pp. 1-5.

Yamada et al., "12.1: LED Backlight for LCDs", IBM Research, Tokyo Research Laboratory, Yamato, Japan, 1998, SID, pp. 1-4.

International Search Report of Application No. PCT/IL02/00452 dated Dec. 9, 2002.

European Search Report of Application No. 04011262 dated Oct. 25, 2005.

"Parameter Values for the HDTV Standards for Production and International Programme Exchange", Rec. ITU-R BT. 709-3 (1990-1994-1995-1998), pp. 1-28.

Yamaguchi, "Multiprimary Color Displays", Color Forum Japan 1999 Proceedings, Kogakuin University, Shinjuku, Tokyo, Nov. 10 & 11, 1999, pp. 73-79.

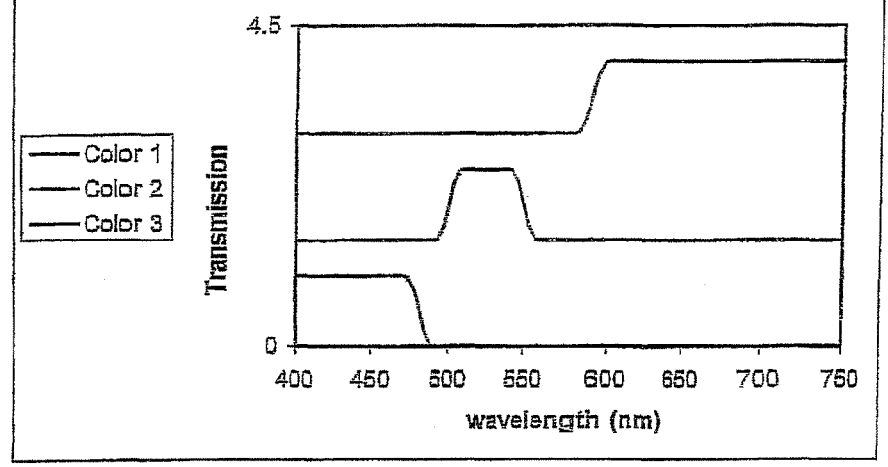
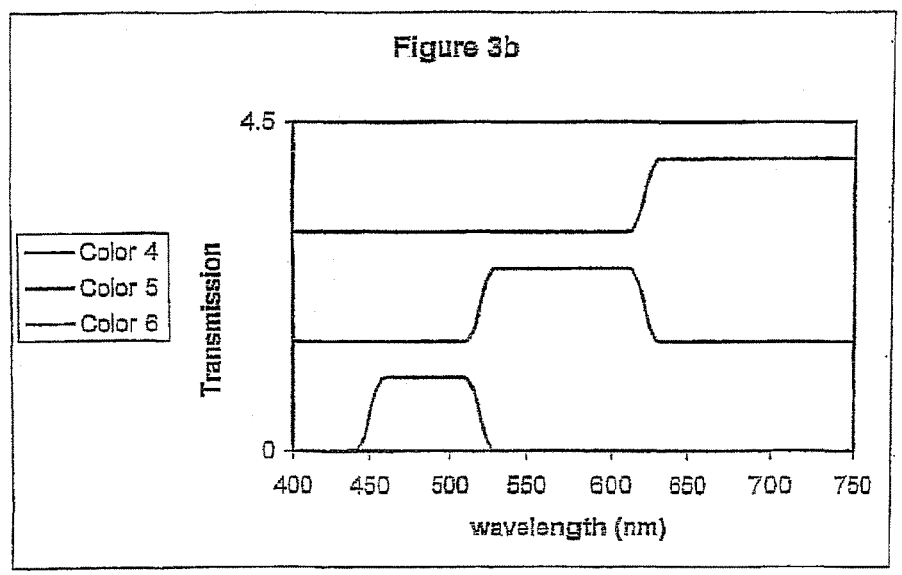

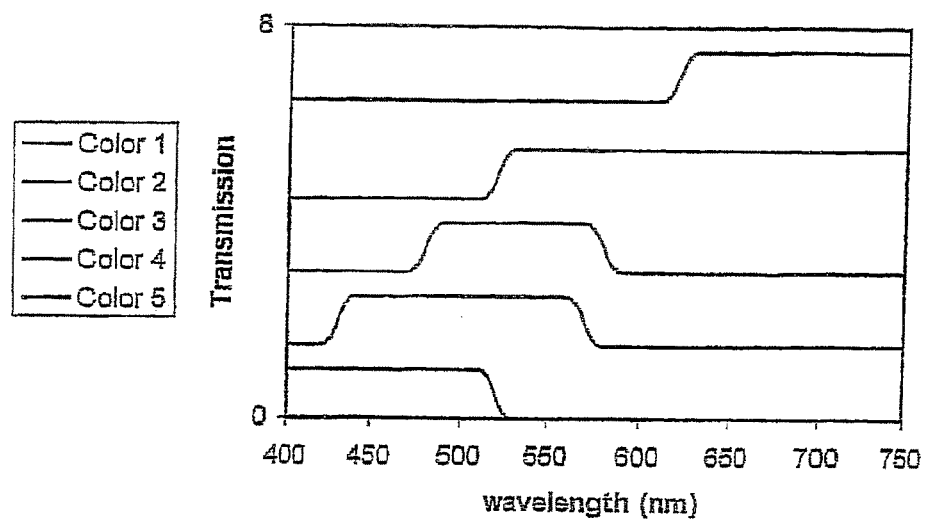
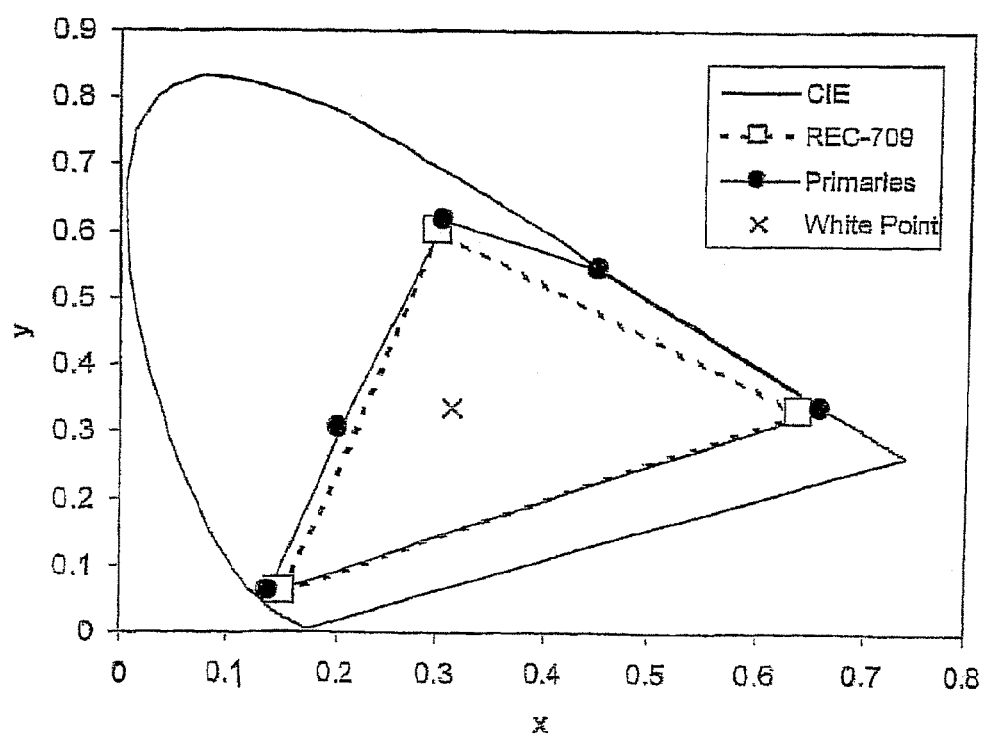

HIGH BRIGHTNESS WIDE GAMUT DISPLAY

CROSS-REFERENCE TO RELATED APPLICATIONS

This application is a continuation application of U.S. patent application Ser. No. 12/272,850, filed Nov. 18, 2008, now U.S. Pat. No. 7,627,167 which is a continuation application of U.S. patent application Ser. No. 10/491,726, filed Apr. 5, 2004, now U.S. Pat. No. 7,471,822 which is a National Phase Application of PCT International Application No. PCT/IL2003/000610, entitled "HIGH BRIGHTNESS WIDE GAMUT DISPLAY", International Filing Date Jul. 24, 2003, published on Jan. 29, 2004 as International Publication No. WO 2004/010407, which in turn claims priority from U.S. Provisional Patent Application No. 60/397,781, filed Jul. 24, 2002, all of which are incorporated herein by reference in their entirety.

FIELD OF THE INVENTION

The invention relates generally to color display devices and methods of displaying color images and, more particularly, to high brightness and/or wide color gamut displays.

BACKGROUND

Various types of color display technologies are known in the art. For example, there are CRT display systems, LCD systems, and projection display systems. In front projection displays, the projected images are viewed from a reflective viewing screen. In rear projection displays, the projected images are viewed through a transmissive viewing screen.

To produce color images, existing display devices use three primary colors, typically, red green and blue, collectively referred to as RGB. In sequential projection display systems, the three primary color components of an image are modulated and displayed sequentially, typically using a single Spatial Light Modulator (SLM) panel. In simultaneous projection display systems, the three primary color components of the image are modulated and displayed simultaneously using one or more SLM panels.

An important consideration in designing projection display devices is the display brightness. Thus, efforts are continually made to increase the optical efficiency of existing designs and, thereby, to increase the luminous output that can be obtained from a given light source.

Unfortunately, the light sources commonly used in existing display devices, for example, the UHP™ lamps available from Philips Lighting, a division of Royal Philips Electronics, Eindhoven, Netherlands, produce non-uniform light spectra wherein, typically, the intensity of the red wavelength range is significantly lower than the intensity of other spectral ranges. Thus, in existing RGB systems, typically, higher brightness may be achieved only by significantly reducing the color saturation of the red wavelength ranges. Further, in projection display systems for home theater applications, wherein highly saturated colors are typically required, filters with narrower spectral transmission ranges are typically used, causing an additional reduction in image brightness.

The quality of color image reproduction can be significantly improved by expanding the color gamut of the display system. This can be achieved by using more than three primary colors to reproduce the image. Display systems using more than three primary colors are described in International Application PCT/IL01/00527, entitled "Device, System and Method For Electronic True Color Display", filed Jun. 7, 2001, and published Dec. 13, 2001 as WO 01/95544, assigned to the assignee of the present application, the entire disclosure of which is incorporated herein by reference.

A six-primary display using superimposed images produced by two projection display devices, wherein each projection display device uses three different primary colors, is described in Masahiro Yamaguchi, Taishi Teraji, Kenro Ohsawa, Toshio Uchiyama, Hideto Motomura Yuri Murakami, and Nagaaki Ohyama, *"Color image reproduction based on the multispectral and multiprimary imaging: Experimental evaluation"*, Device Independent Color, Color Hardcopy and Applications VII, Proc. SPIE, Vol. 4663, pp. 15-26 (2002). In the dual-projection display system described in this reference, the wavelength ranges selected for the six primary color filters are essentially uniformly distributed across the visible spectra of 400-700 nm, with no spectral overlap between the primaries. In this way, a wide gamut may be achieved; however, the combined brightness of the two projection devices is dramatically reduced. In fact, the combined brightness produced by this dual-projection device is lower than the brightness produced by a corresponding single RGB projection device. Dividing the visible spectrum into six (rather than three) ranges does not increase the over-all image brightness because the six primaries cover narrower sub-ranges of the same visible spectrum. An additional reduction of intensity is caused by inherent optical losses in the division of the spectrum into narrower ranges.

SUMMARY OF EMBODIMENTS OF THE INVENTION

An embodiment of the present invention provides a multi-primary color display device, e.g., a color projection display device, which produces images having a wide color gamut at brightness levels significantly higher than those of prior art devices. Further, for a given light source, the brightness level produced by embodiments of the device of the present invention is at least equal, and in some cases higher, than the brightness level of a conventional RGB projection display device using the same light source.

Embodiments of the present invention increase the efficiency of display devices by utilizing a relatively large portion of the polychromatic light generated by a light source, compared to conventional devices, while maintaining a relatively wide color gamut of the displayed images. According to embodiments of the invention, n primaries, wherein n is greater than three, may be selected and used to utilize some or all of the conventionally unused part of the white light generated by the light source, in order to provide increased brightness and/or a wider color gamut.

According to some of these embodiments, an increase in illumination efficiency may be achieved by using partially overlapping primary color spectra, wherein at least two of the primary color spectra overlap significantly. A specifically designed color filtering arrangement, e.g. including sets of filters or other filtering elements, may be used to convert white light into the desired, significantly overlapping spectra. The significantly overlapping primary color spectra may allow a larger percentage of the white light generated by the light source to be utilized by the display device. For example, when the device of the invention is operated in "full illumination" mode, i.e., when all the primary colors are at their maximum levels, the wide color gamut device of the invention may produce a white light output at levels comparable to, or even higher than, those of produced by a corresponding RGB projection device having a much narrower color gamut.

Further, specific designs of the filtering elements and overlap ranges of the wide gamut display of the invention may compensate for non-uniformities and other deficiencies of the light spectra generated by the white light source. In embodiments of the invention, the transmission curves of the filtering elements may be designed specifically to maximize the display brightness for a given color gamut, whereby substantially all colors within the desired color gamut may be reproduced at optimal efficiency.

BRIEF DESCRIPTION OF THE DRAWINGS

The invention will be understood and appreciated more fully from the following detailed description of embodiments of the invention, taken in conjunction with the accompanying drawings of which:

FIGS. 3A and 3B are schematic illustrations of primary color wavelength spectra for a six-primary color display using the configuration of FIG. 2, in accordance with exemplary embodiments of the invention;

FIG. 7 is a schematic illustration of primary color wavelength spectra for a five-primary color display in accordance with another exemplary embodiment of the invention;

FIG. 8 is a schematic illustration of the color gamut resulting from the primary color spectra of FIG. 7;

Figure 1A:
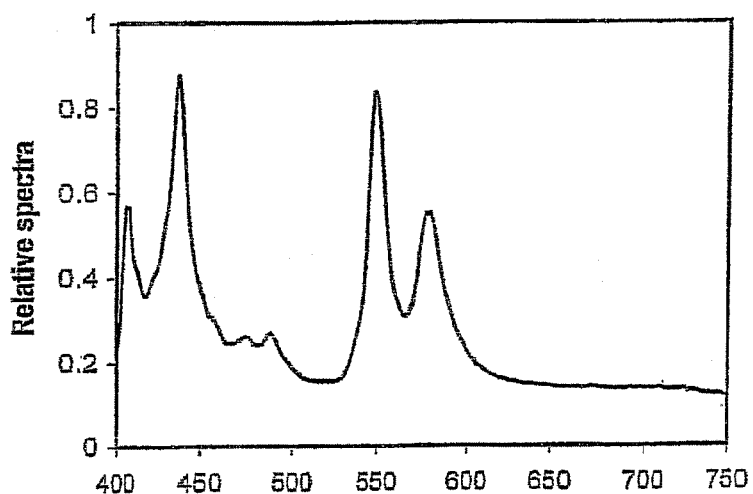
FIG. 1A is a schematic illustration of the spectral output of a high-pressure mercury lamp in accordance with exemplary embodiments of the invention.

It will be appreciated that for simplicity and clarity of illustration, elements shown in the figures have not necessarily been drawn accurately or to scale. For example, the dimensions of some of the elements may be exaggerated relative to other elements for clarity or several physical components included in one element. Further, where considered appropriate, reference numerals may be repeated among the figures to indicate corresponding or analogous elements. It will be appreciated that these figures present examples of embodiments of the present invention and are not intended to limit the scope of the invention.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will be apparent to one skilled in the art that the present invention may be practiced without the specific details presented herein. Furthermore, some features of the invention relying on principles and implementations known in the art may be omitted or simplified to avoid obscuring the present invention.

The following description of exemplary embodiments of the invention is based on a projection display system using a high-pressure mercury lamp, e.g., the UHP™ 100 Watt lamp, available from Philips Lighting, a division of Royal Philips Electronics, Eindhoven, Netherlands, or any other suitable white light source having a similar spectral range. FIG. 1A schematically illustrates the spectral output of the high-pressure mercury UHP™ 100 Watt lamp. It will be appreciated that all other types of high-pressure mercury lamps, such as the VIP lamp available from Osram, Berlin, Germany, have similar spectra and similar designs, so the following examples apply to all such lamps.

Figure 1B:
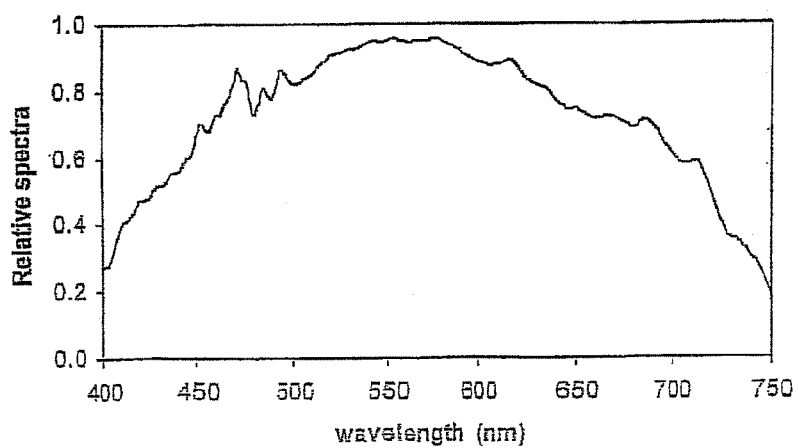
FIG. 1B is a schematic illustration of the spectral output of a Xenon light source in accordance with further exemplary embodiments of the invention.

The examples herein are described in the context of high-pressure mercury type lamps because such lamps are most commonly used in projection display devices. However, some aspects of the embodiments described herein, e.g., the use of significantly overlapping primary color spectral ranges, may be applied in designing color filtering arrangements for other devices using other types of light sources. For example, aspects of the invention may be applied to devices using Xenon (Xe) type light sources, as are known in the art, having a spectral output as illustrated schematically in FIG. 1B. It will be appreciated by persons skilled in the art that the output spectra of the Xe type lamp of FIG. 1B is much smoother, and thus less difficult to accommodate, for the purpose of designing partially-overlapping spectra in accordance with embodiments of the invention, than the relatively "peaky" output spectra of the mercury type lamp of FIG. 1A.

For simplicity, the following description ignores possible non-uniformities in the spectral transmission properties of the optical elements used by the device of the invention. It will be appreciated, however, that such non-uniformities are not significant.

By appropriately selecting a desired set of partially overlapping primary colors, and by appropriately designing a color filtering arrangement to produce such primary colors, the method and device of the following exemplary embodiments of the invention may be implemented in conjunction with any color display system known in the art. In some embodiments of the invention, the display system may use more than three, partially overlapping primary colors. Display systems using more than three primary colors are described in International Application PCT/IL01/00527, entitled "Device, System and Method For Electronic True Color Display", filed Jun. 7, 2001, published Dec. 13, 2001 as WO 01/95544, and in International Application PCT/IL01/01179, entitled "Spectrally Matched Print Proofer", filed Dec. 18, 2001, published Jun. 27, 2002 as WO 02/50763, assigned to the assignee of the present application, the entire disclosure of both of which is incorporated herein by reference.

EXAMPLE 1

Six Primaries, Six-Panel Wide Gamut Display

Figure 2:
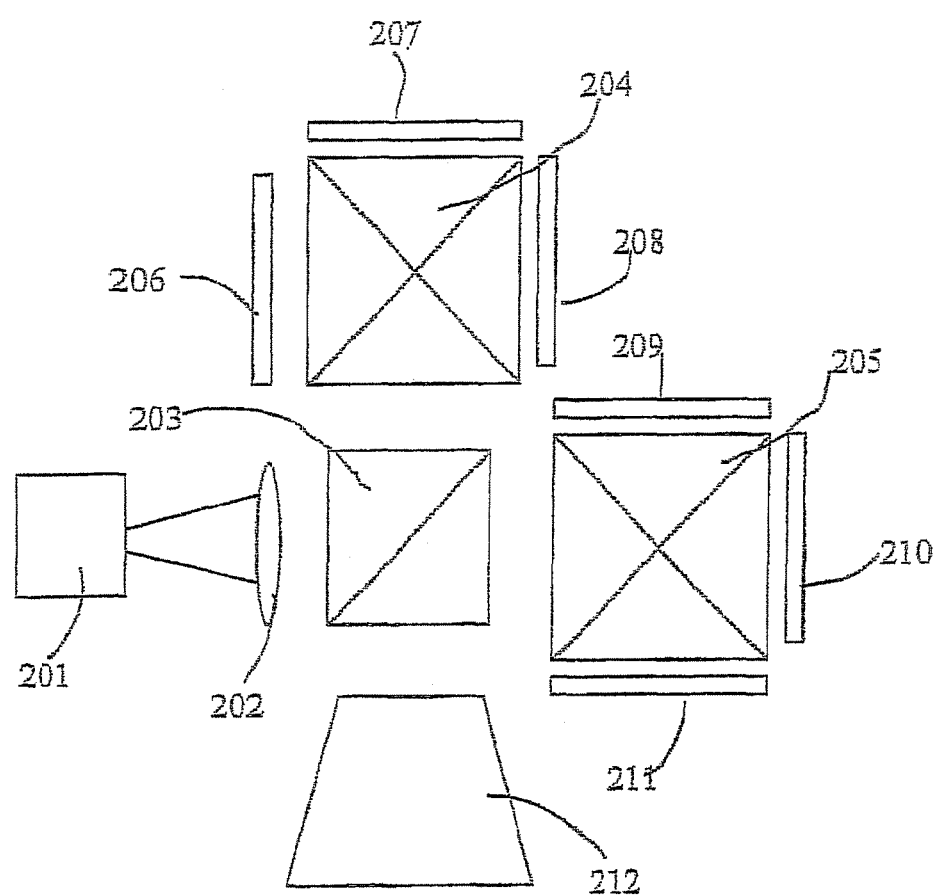
FIG. 2 is a schematic illustration of an optical configuration for a device, in accordance with exemplary embodiments of the invention.

The following example illustrates selection of primary color wavelength ranges for a wide gamut display using six Spatial Light Modulator (SLM) panels, wherein each panel produces one primary color. This configuration may allow full coverage of the typical color gamut of a projection film, e.g., a motion picture positive film, enabling a projection display to produce virtually all the colors that can be produced by projection film, as described below. FIG. 2 schematically illustrates an optical configuration of a device in accordance with this embodiment of the invention. The exemplary configuration of FIG. 2 is particularly adapted for devices using reflective-LCD type SLM panels.

According to embodiments of the invention, light from an illumination unit 201, which may include any suitable white light source known in the art, as described above, may be imaged onto LCD panels 206, 207, 208, 209, 210 and 211, via a relay lens 202, a reflection-transmission element, e.g., a polarizing beam splitter (PBS) 203, and a color separation arrangement, e.g., "X" color-separator cubes 204 and 205. Each of LCD panels 206, 207, 208, 209, 210 and 211 may include an array of pixels, as is known in the art, which may be selectively activated to produce a reflective pattern corresponding to one of a plurality of primary color images. In the example described herein, each LCD panel may be separately activated by a control unit (not shown in the drawings) to produce a reflective pattern corresponding to one of six independent primary color images, in accordance with an input signal representing a six-primary-color image. Such an input signal may be generated using any of the methods described in the above-referenced International Patent Applications, e.g., by converting a three-primary-color image signal into a six-primary-color image signal. As described below, each reflective pattern may modulate a corresponding primary color light beam to produce a corresponding primary color image component.

PBS 203 may split the white light from unit 201 into a reflected "s"-polarized component and a transmitted "p"-polarized component, as is known in the art. The "s"-polarized component may be separated by "X" color separation cube 204 into light beams of three different wavelength ranges, which correspond to three of the six primaries used in this embodiment of the invention. The operation of "X"-cubes as multiple filtering elements for color separation is well known in the art and commercially available. An example of such commercially available component is the Optec™ Standard Cubic Dichroic (X-Cube) Beam-splitter available from Richter Enterprises, Texas, United States.

It may be appreciated by those skilled in the art that any other suitable color filtering arrangement may be used, for example, to implement a desired number of primary colors. For example, the color filtering arrangement may include one "X" color separation cube and a dichroic mirror, as are known in the art, to separate the polarized components into five primary color light beams.

Each pixel of LCD panels 206, 207 and 208, when activated to an "on" state, may convert the "s"-polarized light into corresponding "p"-polarized light, as is known in the art, and may reflect the converted light back via "X" color separation cube 204. The three primary color light beams exiting "X"-cube 204, which beams are modulated in accordance with three, respective, primary color image components, may be transmitted through PBS 203 towards projection lens 212. Analogously, the transmitted "p"-polarized light may be separated by "X" color separation cube 205 into three different color light beams, corresponding to the remaining three primary colors. Each pixel of LCD panels 209, 210 and 211, when activated to an "on" state, may convert the "p"-polarized light into corresponding "s"-polarized light, as is known in the art, and may reflect the converted light back via "X" color separation cube 205. The three color light beams exiting "X"-cube 205, which beams are modulated in accordance with three, respective, primary color image components, may be deflected by PBS 203 towards projection lens 212. The projection lens may project all six modulated colored light beams, i.e., all six primary color image components, onto a viewing screen (not shown in the drawings).

It should be noted that the separate wavelength ranges produced by "X"-cube devices are inherently non-overlapping. Therefore, in the example described herein, there is no spectral overlap among the three primary color spectra produced by each "X"-cube, 204 or 205. Therefore, in this configuration, the desired partial overlap between primary color spectra, in accordance with embodiments of the invention, may be achieved by overlaps between the primary color spectra produced by "X"-cube 204 and the primary color spectra produced by "X"-cube 205. It will be appreciated by persons skilled in the art that essentially any desired overlapping can be achieved between primary color spectra produced by two "X"-cubes.

FIGS. 3A and 3B schematically illustrate primary color wavelength spectra for a six-primary color display using the configuration of FIG. 2. FIG. 3A shows the wavelength spectra of a set of three non-overlapping primary colors having spectral ranges of approximately 400-500 nm, approximately 500-550 nm, and approximately 575-750 nm, respectively, which may be produced by one color separation cube, e.g., "X"-cube 204 in FIG. 2. FIG. 3B shows the wavelength spectra of an additional set of three non-overlapping primary colors having spectral ranges of approximately 450-520 nm, approximately 520-620 nm, and approximately 620-750 nm, respectively, which may be produced by another color separation cube, e.g., "X"-cube 205 in FIG. 2. As shown in the drawings, there is significant overlap between the spectra of each of the primary colors in FIG. 3A and at least one of the primary colors in FIG. 3B, and vice versa. For example, the spectrum at the bottom of FIG. 3B partially overlaps, at different ranges, the two bottom spectra in FIG. 3A. It will be appreciated by persons skilled in the art that, despite the significant overlaps between primaries, the six spectral ranges illustrated in FIGS. 3A and 3B represent six distinct primary colors. According to embodiments of the invention, the specific color choices and partial overlap design of the primary color wavelength ranges shown in FIGS. 3A and 3B may result in a significantly wider color gamut and image brightness, compared to prior art color display devices, as described below.

Figure 4:
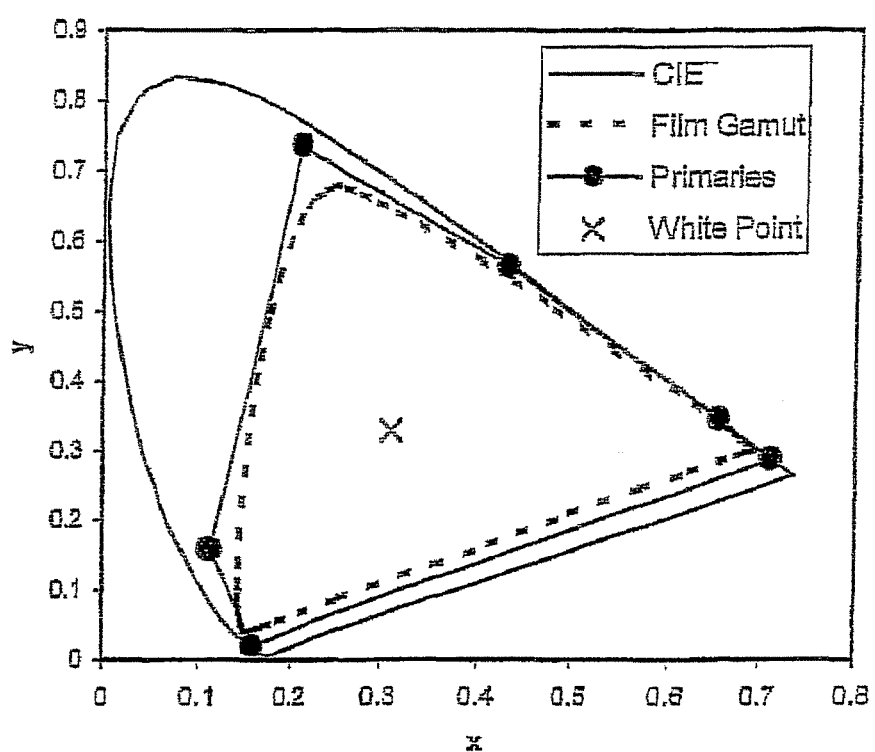
FIG. 4 is a schematic illustration of the color gamut resulting from the primary color spectra of FIGS. 3A and 3B.

FIG. 4 schematically illustrates the resulting color gamut of the primary color spectra of FIGS. 3A and 3B. As clearly shown in FIG. 4, the color gamut produced by a typical positive motion picture film is completely covered by the gamut of the six primary colors of FIGS. 3A and 3B. As further shown in FIG. 4, the white point coordinates obtained by the sum of all primaries are x=0.313 and y=0.329. The luminance values for the colors obtained by this configuration are in general equal to or higher than the luminance values that can be obtained for the same colors from a typical projection film, e.g. a positive motion picture film. Thus, in general, all the colors that can be reproduced by projection film can be reproduced by devices using the primary color selections of FIGS. 3A and 3B, both in terms of color coordinates and in terms of intensity. It should be appreciated that although the primary color selections of FIGS. 3A and 3B provide desirable results in terms of image color and brightness, there may be other suitable selections of six primary colors, with partial overlap, that provide similar (or even better) results, in accordance with specific implementations.

EXAMPLE 2

Multiple Primaries, Single Panel, Sequential Display

Figure 13:
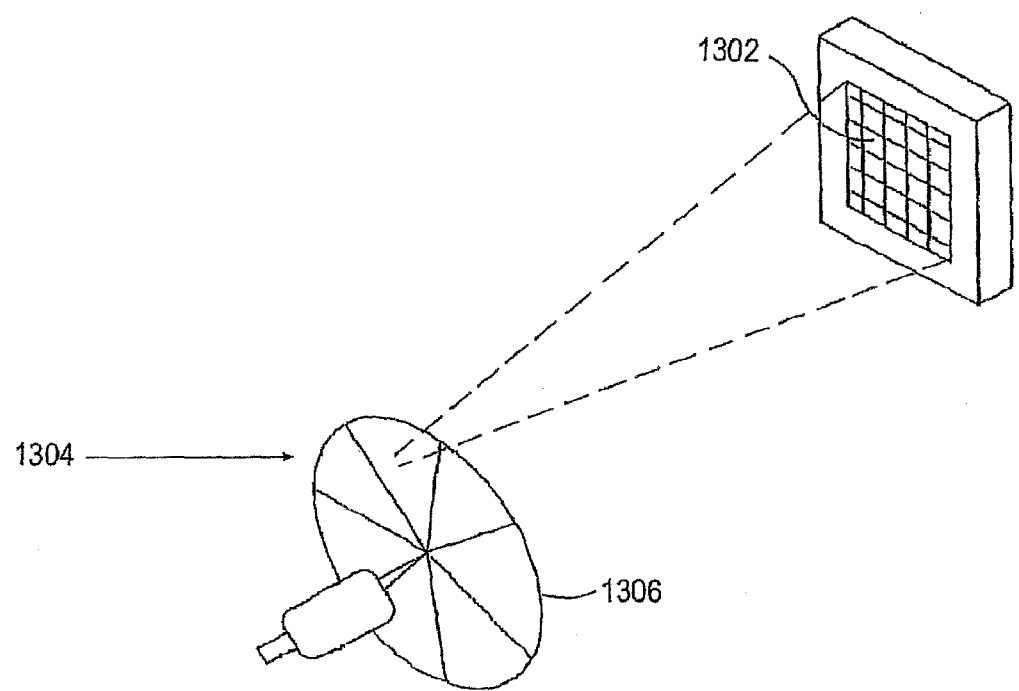
FIG. 13 is a schematic illustration of a color switching mechanism according to some exemplary embodiments of the invention.

The following example illustrates implementation of the present invention in the context of a six-primary-color sequential display. In a sequential display system, the colors are typically produced by a sequential color switching mechanism, e.g. a color wheel 1304 as shown in FIG. 13 or a color drum, which transmits each color for a preset time period (window) within each field of the video stream. In such a system, the relative intensities of the primary colors may be adjusted by adjusting the relative sizes of a plurality of color filter segments 1306 (FIG. 13) on the color wheel. The single panel configuration, e.g., a panel 1302 (FIG. 13), may be implemented with either LCoS (Liquid Crystal on Silicon) or micro-mirror (DMD™) type panels, which are available, for example, from Texas Instruments, U.S.A., as is known in the art. In this example, the spectra of FIGS. 3A and 3B are produced by six filter segments, wherein each filter segments transmit one of the spectra of FIG. 3A or 3B. The operation of multi-primary sequential projection color displays is discussed in detail in the above-referenced International Applications.

For a multiple-primary system, there may be numerous combinations of color filters, having varying relative segment sizes, to produce a desired viewed color, e.g., a desired white color temperature. The relative segment sizes of the color filters may affect the over-all brightness of the display, e.g., relative to the utilized portion of the light generated by the light source. The relative segment sizes of the color filters may also affect the relative intensity of each of the primary colors. Thus, the relative segment sizes of the color filters may be selected to provide a desired, e.g., maximal, over-all brightness of the display and/or a desired relative intensity of each of the primary colors, for example, to optimize specific implementations, as described below.

In order to calculate the reproducible color gamut, the light source spectrum, e.g. as shown in FIG. 1A or FIG. 1B, may be multiplied by a transmission spectrum (not shown) of the optical engine used, e.g., the single panel DMD™ type optical engine. Such multiplication may exclude the influence of the color generating elements, e.g., the color filters. The resulting spectrum may then be multiplied by the transmission spectra of the color filters to provide a set of primary reproducible spectra corresponding to the primary colors, respectively. As is known in the art, CIE 1931 x and y values of the color points corresponding to the primary reproducible spectra may be calculated to determine the reproducible color gamut. The relative segment sizes of the color filters may be selected according to the primary reproducible spectra, so as to provide a maximal over-all brightness, e.g., when all the primary colors are at their maximum levels, and to provide a desired relative intensity for each primary color.

EXAMPLE 3

Five Primaries, Single Panel, Sequential Display

It should be noted that the use of six primary colors is advantageous because six primaries may provide more flexibility in color adjustment compared to systems using less than six primaries. However, according to some embodiments of the invention, there are certain advantages in using less than six primary colors. One such advantage is that more time can be allocated to each primary in a sequential projection system, thereby improving the temporal resolution (bit depth) of the displayed image. According to this embodiment of the invention, five primary colors may be used. For example, the five primaries may include a blue color having a wavelength spectral range from about 400 nm to between 460 nm and 540 nm, a cyan color having a spectral range from between 400 nm and 460 nm to between 500 nm and 560 nm, a green color having a spectral range from between 480 nm and 520 nm to between 540 nm and 580 nm, a yellow color having a spectral range from between 500 nm and 550 nm to 650 nm or more, and a red color having a spectral range from between 580 nm and 620 nm to 700 nm or more.

Figure 5:
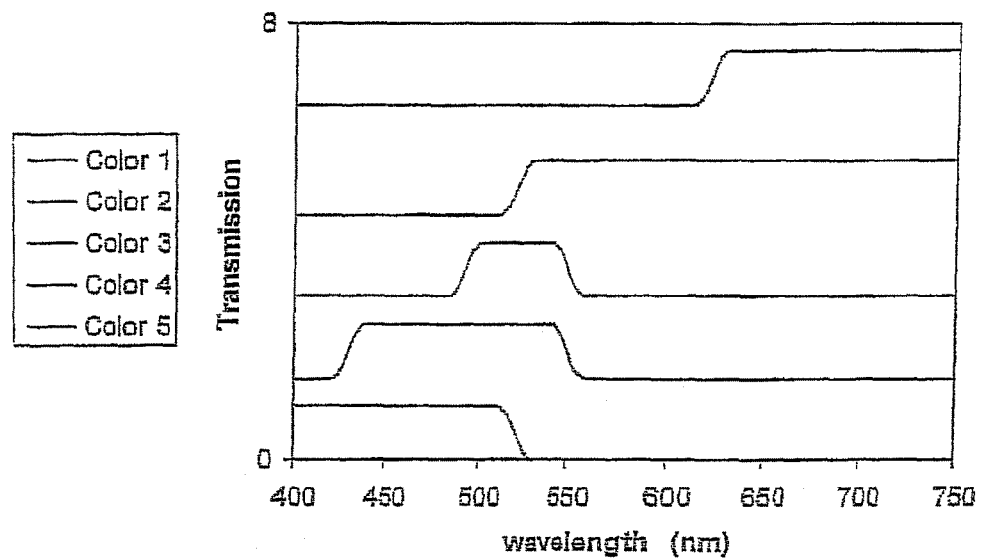
FIG. 5 is a schematic illustration of primary color wavelength spectra for a five-primary color display in accordance with one exemplary embodiment of the invention.

FIG. 5 schematically illustrates transmission spectra for five filter segments that may be used by a five-primary-color display in accordance with embodiments of the invention. The filter selections of FIG. 5 may enable reproduction of a color gamut that is slightly wider than the standard NTSC color gamut, especially in the yellow-red regions, e.g., the yellow-red colors that can be displayed by this system may be more saturated than those allowed by the standard NTSC gamut, as shown schematically in FIG. 6. In order to balance the white point with all primaries fully transmitted, as described above, the relative segment sizes of the blue, cyan, green, yellow and red primaries in this example are 0.8, 0.8, 0.6, 1.1 and 1.7, respectively. This configuration may allow a brightness gain of about 40 percent over the six-primary color wheel configuration described above with reference to the primary color selections of FIGS. 3A and 3B. Furthermore, the brightness of a display device using the five primary color filter selections of FIG. 5 may produce image brightness about 1.9 times higher than the image brightness of a three-primaries (e.g., RGB) projection display using NTSC primary colors (with relative sizes of 0.5, 1, and 1.6 for the blue, green and red color filter segments, respectively). According to these embodiments, the increase in brightness may be achieved by increasing the amount of overlap between the transmission spectra of the different color filter segments, resulting in a slightly narrower color gamut than the six-primary color gamut shown in FIG. 4

Another possible application of multiple primaries is for significantly increasing the brightness of a device producing the color gamut of a conventional REC-709 or similar display. FIG. 7 schematically illustrates filter transmission curves according to this embodiment of the invention. The filter segments in this example are used with relative segment sizes of 1, 0.9, 0.4, 1 and 1.7 for the blue, cyan, green, yellow and red primary color filter segments, respectively. The resulting color gamut of this embodiment is illustrated schematically in FIG. 8. It will be appreciated that the color gamut produced in this example is still larger than the REC-709 color gamut, particularly in the yellow and cyan regions. However, the brightness that may be achieved by this display is about 40 percent higher than the brightness of a corresponding display using only the standard REC-709 RGB filters (with relative segment sizes of 0.8, 0.7, 1.5 for the blue, green and red primary color filter segments, respectively).

EXAMPLE 4

Four Primaries, Single Panel, Sequential Display

In some embodiments of the invention, a four primaries display may also provide many advantages for the multiprimary color display. According to these embodiments, improved brightness may be achieved by the addition of a yellow primary color filter segment to the RGB segments. White balance may be achieved by adjusting the relative segment sizes, as described above. For example, the four primary colors may include a blue color having a wavelength spectral range from about 400 nm to between 460 nm and 540 nm, a green color having a spectral range from between 480 nm and 520 nm to between 540 nm and 580 nm, a yellow color having a spectral range from between 500 nm and 550 nm to 650 nm or more, and a red color having a spectral range from between 580 nm and 620 nm to 700 nm or more.

Figure 6:
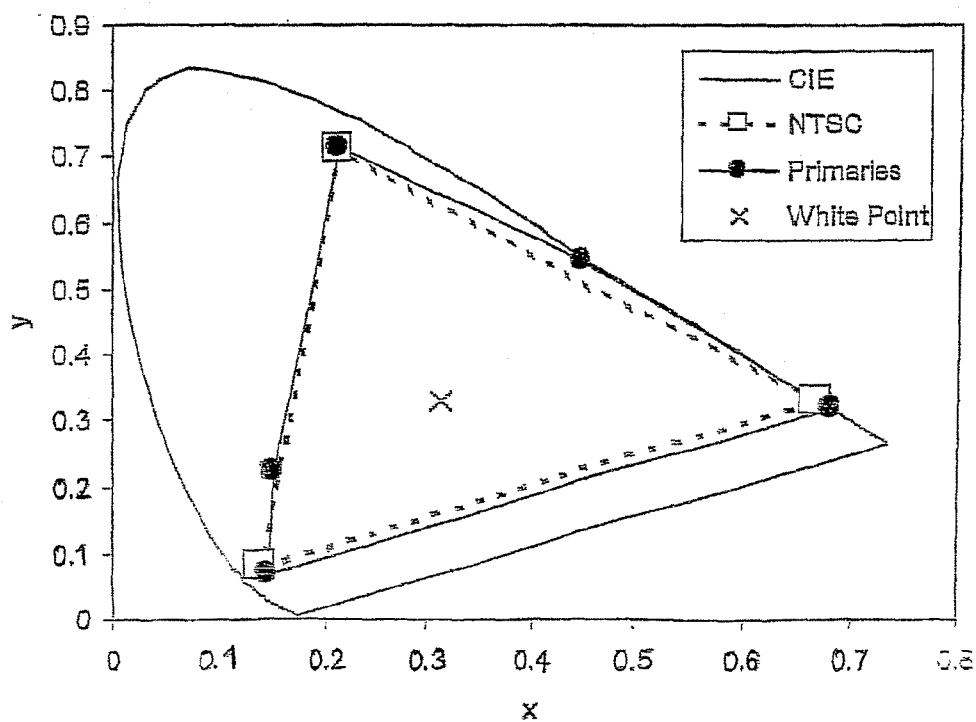
FIG. 6 is a schematic illustration of the color gamut resulting from the primary color spectra of FIG. 5.
Figure 9:
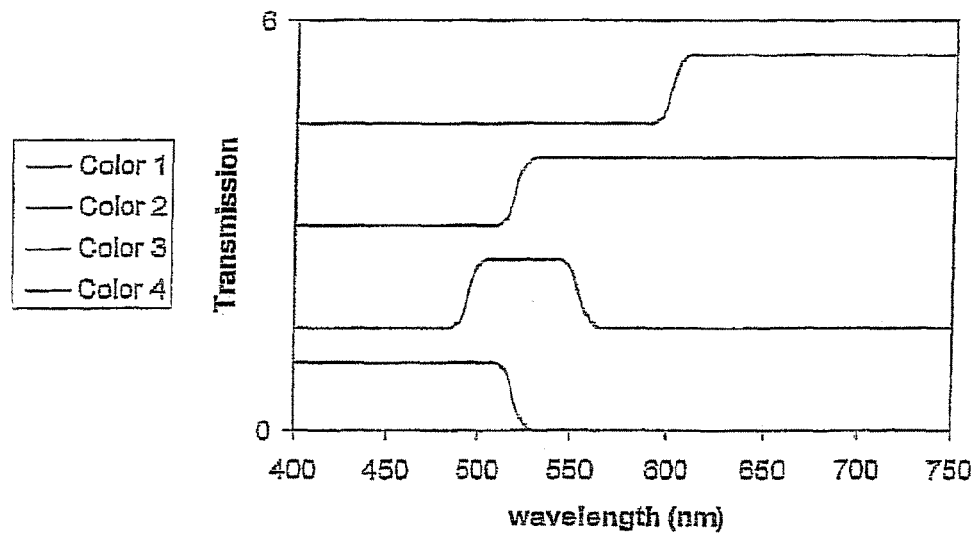
FIG. 9 is a schematic illustration of primary color wavelength spectra for a four-primary color display in accordance with one exemplary embodiment of the invention.
Figure 10:
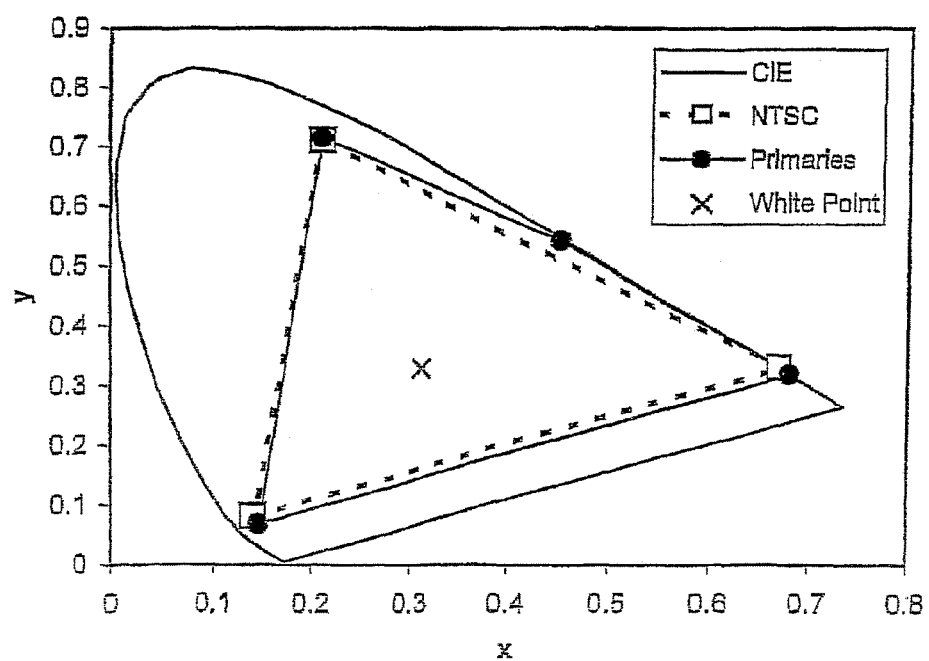
FIG. 10 is a schematic illustration of the color gamut resulting from the primary color spectra of FIG. 9.

FIG. 9 schematically illustrates transmission curves of four primary color filter segments that may enable the device to produce a gamut comparable to the NTSC standard gamut, as schematically illustrated in FIG. 10, which is similar to the five-primary color gamut shown in FIG. 6. White balance may be achieved, as described above, by using relative segment sizes of 1.2, 0.8, 1 and 1 for the blue, green, yellow and red primary color filter segments, respectively. This configuration may result in an image brightness gain of about 90% over the brightness level of a white-balance-corrected NTSC RGB color gamut (with relative segment sizes of 0.6, 1 and 1.5 for the blue, green and red primaries, respectively), i.e., the brightness gain in this example is similar to the brightness gain of the five-primary color display described above.

Figure 11:
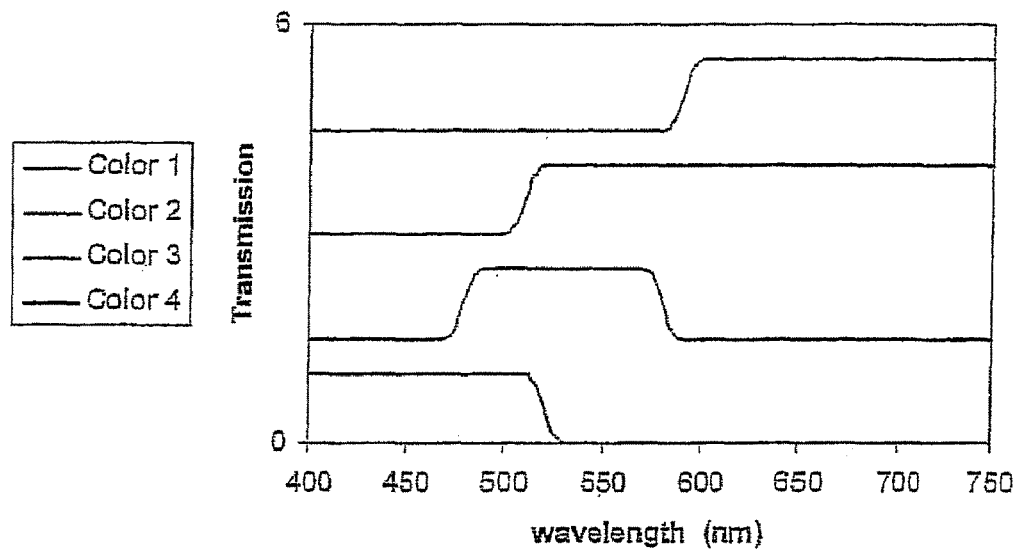
FIG. 11 is a schematic illustration of primary color wavelength spectra for a four-primary color display in accordance with another exemplary embodiment of the invention.
Figure 12:
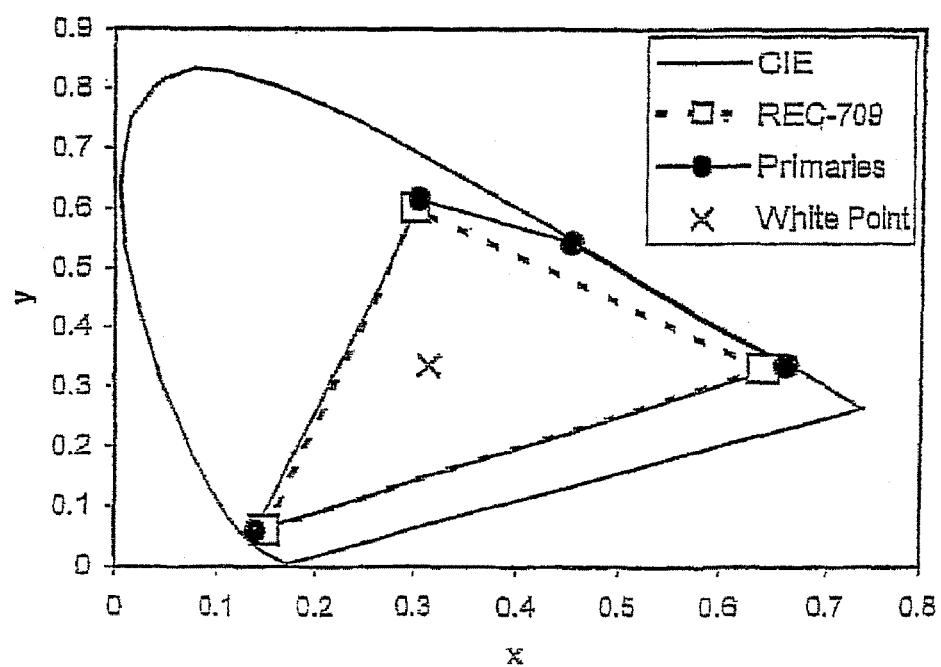
FIG. 12 is a schematic illustration of the color gamut resulting from the primary color spectra of FIG. 11.

In other embodiments of the invention, a four-primary color display may be used to increase the brightness of an REC-709 gamut by adding a yellow primary color filter segment. The filters transmission curves for this alternate embodiment are schematically illustrated in FIG. 11. The spectral ranges of FIG. 11 may be wider than the spectral ranges of FIG. 9 in order to reproduce a wider color gamut. The relative sizes of the color filter segments used in this example are 1.5, 0.7, 1.2 and 0.9 for the blue, green, yellow and red primary color filter segments, respectively. The resulting color gamut of this example is schematically illustrated in FIG. 12. It will be appreciated that this gamut is still larger than the REC-709 color gamut, particularly in the yellow regions, as shown in FIG. 12. The brightness that may be achieved by this display is about 50 percent higher than the brightness of a display using only the REC-709 RGB color filter segments (with relative segment sizes of 0.8, 0.7, 1.5, for the blue, green and red primary color segments, respectively).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A display device to produce a color image, the device comprising a color filtering mechanism to sequentially produce light of at least four non-white colors by transmission through at least four non-white color filters respectively, each color filter having a relative segment size, wherein the relative segment size of at least a first of said non-white color filters is greater than the relative segment size of at least a second of said non-white color filters.

2. The device of claim 1, wherein said color filtering mechanism comprises a plurality of filter segments on a color wheel.

3. The device of claim 1, further comprising a light source.

4. The device of claim 1, further comprising a spatial light modulator to produce said color image by modulating light filtered by said color filtering mechanism.

5. The display device of claim 1, wherein said at least four color filters comprise a blue color filter, a green color filter, a yellow color filter, and a red color filter, wherein the blue color filter has the greatest relative segment size, and wherein the green color filter has the smallest relative segment size.

6. The display device of claim 1, wherein said at least four color filters comprise at least five color filters.

7. The display device of claim 6, wherein said at least five color filters comprise a blue color filter, a green color filter, a yellow color filter, a red color filter, and a cyan color filter, wherein the red color filter has the greatest relative segment size, and wherein the green color filter has the smallest relative segment size.

8. The display device of claim 7, wherein said yellow color filter has greater relative segment size than each of the blue and cyan color filters.

9. The display device of claim 8, wherein said blue color filter has greater relative segment size than the cyan color filter.

10. A computerized apparatus operable to cause a display apparatus having a light source to perform a method of producing a color image, the method comprising activating the light source to sequentially transmit light of at least four non-white colors corresponding to said color image through at least four non-white color filters respectively, each color filter having a relative segment size, wherein the relative segment size of at least a first of said non-white color filters is greater than the relative segment size of at least a second of said non-white color filters.

11. The computerized apparatus of claim 10, wherein the sequential transmission of light of said colors comprises sequentially filtering light of an illumination unit.

12. The computerized apparatus of claim 10, wherein said at least four color filters comprise a blue color filter, a green color filter, a yellow color filter, and a red color filter, wherein the blue color filter has the greatest relative segment size, and wherein the green color filter has the smallest relative segment size.

13. The computerized apparatus of claim 10, wherein said at least four color filters comprise at least five color filters.

14. The computerized apparatus of claim 13, wherein said at least five color filters comprise a blue color filter, a green color filter, a yellow color filter, a red color filter, and a cyan color filter, wherein the red color filter has the greatest relative segment size, and wherein the green color filter has the smallest relative segment size.

15. The computerized apparatus of claim 14, wherein said yellow color filter has greater relative segment size than each of the blue and cyan color filters.

16. The computerized apparatus of claim 15, wherein said blue color filter has greater relative segment size than the cyan color filter.

* * * * *